(12) United States Patent
Klefenz et al.

(10) Patent No.: US 7,035,742 B2
(45) Date of Patent: Apr. 25, 2006

(54) APPARATUS AND METHOD FOR CHARACTERIZING AN INFORMATION SIGNAL

(75) Inventors: Frank Klefenz, Mannheim (DE); Karlheinz Brandenburg, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 10/950,309

(22) Filed: Sep. 23, 2004

(65) Prior Publication Data

US 2005/0038635 A1 Feb. 17, 2005

Related U.S. Application Data

(63) Continuation of application No. PCT/EP03/01916, filed on Feb. 25, 2003.

(30) Foreign Application Priority Data

Jul. 19, 2002 (DE) ................................ 102 32 916

(51) Int. Cl.
*G06F 19/00* (2006.01)

(52) U.S. Cl. .......................... 702/66; 702/189; 381/58; 704/1; 704/200; 704/231; 704/246; 704/251; 704/270

(58) Field of Classification Search ................ 702/189, 702/66; 704/200, 1, 231, 246, 251, 270; 381/58; 707/1, 6; 84/453, 604

See application file for complete search history.

(56) References Cited

U.S. PATENT DOCUMENTS 5,033,089 A 7/1991 Fujimoto et al. ............. 381/43

(Continued)

FOREIGN PATENT DOCUMENTS

WO WO 01/88900 11/2001

OTHER PUBLICATIONS

Niesing, "What's That Melody?", Fraunhofer magazine, 2002.*

(Continued)

*Primary Examiner*—Patrick J. Assouad
(74) *Attorney, Agent, or Firm*—Michael A. Glenn; Glenn Patent Group

(57) ABSTRACT

For characterizing an information signal having an amplitude-time waveform with local extreme values, at first the local extreme values of the information signal are determined, wherein a local extreme value is defined by a time instant and an amplitude. Furthermore, area information of valleys or mountains of the information signal in case of a one-dimensional amplitude of the information signal or volume information in case of a two-dimensional amplitude of the information signal of valleys or mountains is ascertained. A valley or mountain is defined by a temporal section of the information signal, wherein the section of the information signal extends from the time instant of a local extreme value to a temporarily adjacent value of the information signal having the same amplitude as the local extreme value. Area or volume information of several mountains or valleys is characteristic for the information signal and permits further characterization of the information signal, build-up of an information signal database, or identification of an information signal on the basis of an existing information signal database. Area or volume information is on the one hand characteristic for the information signal and on the other hand, due to its integral nature, robust against information signal changes in form of overlays or distortions.

28 Claims, 5 Drawing Sheets

U.S. PATENT DOCUMENTS

| | | | | |
|---|---|---|---|---|
| 5,903,892 | A * | 5/1999 | Hoffert et al. | 707/10 |
| 5,983,176 | A * | 11/1999 | Hoffert et al. | 704/233 |
| 6,188,010 | B1 * | 2/2001 | Iwamura | 84/609 |
| 6,307,139 | B1 * | 10/2001 | Iwamura | 84/601 |
| 6,437,227 | B1 * | 8/2002 | Theimer | 84/609 |
| 6,442,510 | B1 * | 8/2002 | Klefenz | 702/189 |
| 6,453,252 | B1 * | 9/2002 | Laroche | 702/75 |
| 6,528,715 | B1 * | 3/2003 | Gargi | 84/615 |
| 6,545,209 | B1 * | 4/2003 | Flannery et al. | 84/609 |
| 6,657,117 | B1 * | 12/2003 | Weare et al. | 84/668 |
| 6,678,680 | B1 * | 1/2004 | Woo | 707/6 |
| 6,910,035 | B1 * | 6/2005 | Hoekman et al. | 707/4 |
| 6,913,466 | B1 * | 7/2005 | Stanfield et al. | 434/219 |
| 2002/0037082 | A1 * | 3/2002 | Weare et al. | 381/58 |
| 2002/0083060 | A1 * | 6/2002 | Wang et al. | 707/10 |
| 2002/0087565 | A1 * | 7/2002 | Hoekman et al. | 707/100 |
| 2003/0023421 | A1 * | 1/2003 | Finn et al. | 704/1 |
| 2003/0037036 | A1 * | 2/2003 | Weare | 707/1 |
| 2003/0041066 | A1 * | 2/2003 | Stanfield et al. | 707/100 |
| 2003/0045953 | A1 * | 3/2003 | Weare | 700/94 |
| 2003/0045954 | A1 * | 3/2003 | Weare et al. | 700/94 |
| 2003/0061490 | A1 * | 3/2003 | Abajian | 713/176 |
| 2003/0089216 | A1 * | 5/2003 | Birmingham et al. | 84/609 |
| 2003/0089218 | A1 * | 5/2003 | Gang et al. | 84/615 |
| 2003/0135377 | A1 * | 7/2003 | Kurianski et al. | 704/500 |
| 2004/0003706 | A1 * | 1/2004 | Tagawa et al. | 84/609 |
| 2004/0060424 | A1 * | 4/2004 | Klefenz et al. | 84/616 |
| 2004/0060426 | A1 * | 4/2004 | Weare et al. | 84/668 |
| 2004/0074378 | A1 * | 4/2004 | Allamanche et al. | 84/616 |
| 2004/0094019 | A1 * | 5/2004 | Herre et al. | 84/611 |
| 2004/0107821 | A1 * | 6/2004 | Alcalde et al. | 84/608 |
| 2004/0158437 | A1 * | 8/2004 | Klefenz et al. | 702/189 |
| 2004/0194612 | A1 * | 10/2004 | Parees | 84/609 |
| 2004/0255758 | A1 * | 12/2004 | Klefenz et al. | 84/603 |
| 2004/0267736 | A1 * | 12/2004 | Yamane et al. | 707/3 |
| 2005/0071329 | A1 * | 3/2005 | Weare | 707/3 |
| 2005/0092165 | A1 * | 5/2005 | Weare et al. | 84/668 |
| 2005/0097075 | A1 * | 5/2005 | Hoekman et al. | 707/1 |
| 2005/0109194 | A1 * | 5/2005 | Gayama | 84/613 |
| 2005/0131688 | A1 * | 6/2005 | Goronzy et al. | 704/240 |
| 2005/0147256 | A1 * | 7/2005 | Peters et al. | 381/56 |

OTHER PUBLICATIONS

Niesing, "Hum and Find", Fraunhofer magazine, 2004.*

Allamanche, E. et al., Content-based Identification of Audio Material Using MPEG-7 Low Level Description.

Davy, M. and S.J. Audio Information Retrieval: A Bibliographical Study, Feb. 2002.

* cited by examiner

APPARATUS AND METHOD FOR CHARACTERIZING AN INFORMATION SIGNAL

CROSS-REFERENCE TO RELATED APPLICATION

This application is a continuation of co-pending International Application No. PCT/EP03/01916, filed Feb. 25, 2003, which designated the United States and was not published in English.

BACKGROUND OF THE INVENTION

1. Field of the Invention

The present invention relates to the processing of information signals, and in particular to the feature extraction of information signals for example for the characterization of the information signals or for the identification and database search.

2. Description of the Related Art

Concepts by which the time signals with harmonic content, such as audio data, can be identified and referenced are useful for many users. In particular, in a situation in which an audio signal whose title and author are unknown is present, it is often desirable to find out by whom the corresponding song is. A need for this exists for example when there is the wish to acquire e.g. a CD of the performer concerned. If the present audio signal only includes the time signal content, but no name about the performer, the music publishers etc., identification of the original of the audio signal, or by whom a song is, is not possible. The only hope was then to hear the audio piece once again together with reference data concerning the author or the source where the audio signal may be acquired, so as to then be able to get the desired title.

On the Internet, it is not possible to search for audio data using conventional search engines, because the search engines can only deal with textual data. Audio signals, or more generally speaking, time signals having a harmonic content cannot be processed by such search engines if they do not include textual search indications.

A realistic inventory of audio files lies at several thousand audio files stored up to hundreds of thousands of audio files. Music database information may be filed on a central Internet server, and potential search queries could take place via the Internet. Alternatively, with today's hard disk capacities, central music databases are also possible on users' local hard disk systems. It is desirable to be able to search such music databases to find out about reference data about an audio file from which only the file itself but no reference data is known.

In addition, it is likewise desirable to be able to search music databases using default criteria, which for example go so as to be able to find out similar pieces. Similar pieces are for example the pieces with a similar melody, a similar set of instruments, or simply with similar noises, such as roaring of the sea, twittering of birds, male voices, female voices, etc.

U.S. Pat. No. 5,918,223 discloses a method and an apparatus for a content-based analysis, storage, recovery and segmentation of audio information. This method is based on extracting several acoustic features from an audio signal. Volume, bass, pitch, brightness and mel frequency-based cepstral coefficients are measured in a time window of determined length in periodical interval distances. Each measurement data set consists of a series of measured feature vectors. Each audio file is specified by the complete set of the feature series calculated per feature. Furthermore, the first derivatives for each series of feature vectors are calculated. Then, statistical values, such as average value and standard deviation, are calculated. This set of values is stored in an N vector, i.e. a vector with n elements. This procedure is applied on a multiplicity of audio files to derive an N vector for each audio file. With this, a database of a multiplicity of N vectors is gradually built up. Using the same procedure, a search N vector is then extracted from an unknown audio file. In a search query, a distance calculation of the default N vector and the N vectors stored in the database is then ascertained. Finally, the N vector having the minimum distance to the search N vector is output. Data about the author, the title, the acquisition source etc. are associated with the output N vector, so that an audio file may be identified with regard to its origin.

This method has the disadvantage that several features are calculated and arbitrary heuristics are introduced for the calculation of the characteristic quantities. By average value and standard deviation calculations across all feature vectors for an entire audio file, the information given by the progress in time of the feature vectors is reduced to few feature quantities. This leads to a high loss of information.

Basically, all so-called features employed for identification of information signals have to fulfill two opposing requirements. The one requirement is to provide a characterization of an information signal that is as good as possible. The other requirement is that the feature must not require particularly much storage space, i.e. have as little information as possible. With regard to the storage space, smaller features immediately lead to smaller information signal databases and also result in faster database search to be able to make a qualitative statement on an information signal to be tested or even a quantitative statement on such an information signal.

A further requirement, which is also important, for the feature to be extracted from the information signal is that the feature should be robust against changes. Such changes consist in system-immanent noise, a distortion e.g. due to a lossy encoding method. Other signal changes are for example alteration of the volume, taking as an example an audio signal, as well as distortions due to playing an audio signal via a loudspeaker and re-recording the audio signal via a microphone etc.

SUMMARY OF THE INVENTION

It is the object of the present invention to provide a flexible and robust concept for characterizing an information signal.

In accordance with a first aspect, the present invention provides an apparatus for characterizing an information signal having an amplitude-time waveform with local extreme values, having a processor for determining the local extreme values of the information signal, wherein a local extreme value is defined by a time instant and an amplitude; and a calculator for ascertaining area information of valleys or mountains of the information signal in case of a one-dimensional amplitude of the information signal or of volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys is characteristic for the information signal.

In accordance with a second aspect, the present invention provides a method for characterizing an information signal having an amplitude-time waveform with local extreme values, with the steps of determining the local extreme values of the information signal, wherein a local extreme value is defined by a time instant and an amplitude; and ascertaining area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal.

In accordance with a third aspect, the present invention provides an apparatus for building up an information signal database, having a characterizer for characterizing an information signal having an amplitude-time waveform with local extreme values to obtain area information for an information signal, having a processor for determining the local extreme values of the information signal, wherein a local extreme value is defined by a time instant and an amplitude; and a calculator for ascertaining area information of valleys or mountains of the information signal in case of a one-dimensional amplitude of the information signal or of volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys is characteristic for the information signal; a feeder for feeding several information signals to the characterizer, to obtain, for each information signal, a feature vector derived from the area information for the information signal; and a storage for storing feature vectors for the information signals, wherein an identifier of the information signal from which the respective feature vector has been ascertained, is associated with each feature vector.

In accordance with a fourth aspect, the present invention provides a method for building up an information signal database, with the steps of characterizing an information signal having an amplitude-time waveform with local extreme values to obtain area information for an information signal, with the steps of determining the local extreme values of the information signal, wherein a local extreme value is defined by a time instant and an amplitude; and ascertaining area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal; performing the step of characterizing with several information signals to obtain a feature vector derived from the area information for the information signal for each information signal; and storing feature vectors for the information signal, wherein an identifier of the information signal from which the respective feature vector has been ascertained is associated with each feature vector.

In accordance with a fifth aspect, the present invention provides an apparatus for identifying an information signal using an information signal database storing the feature vectors in association with respective information signal identifiers, having a characterizer for characterizing an information signal having an amplitude-time waveform with local extreme values, to obtain area information of several mountains or valleys, which are characteristic for the information signal, having a processor for determining the local extreme values of the information signal, wherein a local extreme value is defined by a time instant and an amplitude; and a calculator for ascertaining area information of valleys or mountains of the information signal in case of a one-dimensional amplitude of the information signal or of volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys is characteristic for the information signal; and a comparator for comparing a feature vector derived from the area information or volume information characteristic for a test information signal with feature vectors stored in the information signal database, to make a statement on the information signal.

In accordance with a sixth aspect, the present invention provides a method for identifying an information signal using an information signal database storing the feature vectors in association with respective information signal identifiers, with the steps of characterizing an information signal having an amplitude-time waveform with local extreme values, to obtain area information of several mountains or valleys, which are characteristic for the information signal, with the steps of determining the local extreme values of the information signal, wherein a local extreme value is defined by a time instant and an amplitude; and ascertaining area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal; and comparing a feature vector derived from the area information or volume information characteristic for a test information signal with feature vectors stored in the information signal database, to make a statement on the information signal.

In accordance with a seventh aspect, the present invention provides a computer program with a program code for performing, when the program runs on a computer, a method for characterizing an information signal having an amplitude-time waveform with local extreme values, with the steps of determining the local extreme values of the information signal, wherein a local extreme value is defined by a time instant and an amplitude; and ascertaining area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal.

In accordance with an eighth aspect, the present invention provides a computer program with a program code for performing, when the program runs on a computer, a method for building up an information signal database, with the steps of characterizing an information signal having an amplitude-time waveform with local extreme values to obtain area information for an information signal, with the steps of determining the local extreme values of the information signal, wherein a local extreme value is defined by a time instant and an amplitude; and ascertaining area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal; performing the step of characterizing with several information signals to obtain a feature vector derived from the area information for the information signal for each information signal; and storing feature vectors for the information signal, wherein an identifier of the information signal from which the respective feature vector has been ascertained is associated with each feature vector.

In accordance with a ninth aspect, the present invention provides a computer program with a program code for performing, when the program runs on a computer, a method for identifying an information signal using an information signal database storing the feature vectors in association with respective information signal identifiers, with the steps of characterizing an information signal having an amplitude-time waveform with local extreme values, to obtain area information of several mountains or valleys, which are characteristic for the information signal, with the steps of determining the local extreme values of the information signal, wherein a local extreme value is defined by a time instant and an amplitude; and ascertaining area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal; and comparing a feature vector derived from the area information or volume information characteristic for a test information signal with feature vectors stored in the information signal database, to make a statement on the information signal.

The present invention is based on the finding that a characteristic representation of an information signal on the one hand and a representation of the information signal with limited storage expenditure on the other hand may be achieved by the amplitude-time waveform of the information signal being processed insofar as local extreme values are determined, and area information in the case of an information signal with one-dimensional amplitude or volume information in the case of an audio signal with two-dimensional amplitude of valleys or mountains of the information signal are ascertained, wherein a local extreme value as well as a temporal section are associated with each valley or mountain of the information signal, wherein the temporal section of the information signal for a mountain or for a valley extends from the time incident of the local extreme value to a temporally adjacent value of the information signal having the same amplitude as the local extreme value. Thereby, area information and volume information, respectively, which are characteristic for the information signal, are obtained in temporally successive representation.

The present invention is advantageous insofar as the characteristic properties of an amplitude-time waveform in the form of area information or volume information are integral quantities, which are, in contrast to for example amplitude time tupels or other features rather approximated to the acoustic properties of an audio signal, relatively invariant quantities having a high robustness against distortions, noise, etc. in their actual quantitative quantity or at least their relative quantity with regard to a temporal sequence.

In addition, the inventive concept of the representation of an information signal by integral quantities derived from the amplitude-time waveform of the information signal enables a strongly compressed representation leading to small databases on the one hand and short search durations for searching a database using such a characteristic of a signal to be tested on the other hand.

A further advantage of the inventive concept is that the representation of an information signal with an amplitude-time waveform on the basis of integral area or volume information in temporal series is particularly well suited for information signals having repeating basic structures, such as audio signals. For example, instruments provide a signal that is characteristic for each instrument, and that has, in particular, a series of area information characteristic for each instrument. Repeating patterns occur when an instrument plays successive tones. This pattern can immediately be found the successive area information. Pattern recognition of the series of area information may thus be used to segment the audio signal, to be able to make diverse post-processing, such as a polyphonic sound recognition, a musical instrument recognition, or a melody recognition. In addition, spoken sounds distinguish themselves by repeating signal patterns. The inventive concept therefore is also suited for the post-processing of voice signals to perform voice recognition, for example.

Quasi-stationary audio signals as an example for information signals particularly well suited for the inventive concept, wherein the audio signals are for example represented by voice sounds or musical instrument sounds, distinguish themselves by replicas of the same or an only slowly variable bottom profile or the same or an only slowly variable audio signal form being lined up n times, depending on how long the voice sound is held or how long the tone is held. Replicas of the same signal form are asserted locally by like or only slightly deviating area information in the series of area information of preferably the original and the complimentary signal being compared with each other.

Like wave trains are identified by like area contents being associated. The absolute content, i.e. an area integral, however, may also indicate whether it is a vowel, consonant, a certain musical instrument, a high-frequency tone, etc.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Before going into the subsequent figures in greater detail, at first the general principle is explained for better clarity of the invention. Following the subsequent discussion, the inventive concept for audio signals as information signals is also designated as "audio watershed". This concept is a concept with which audio signals are sub-divisible into intervals. In geodesy, the concept may be described very clearly. Mountain and valley information is filled by rainwater. The water gathers in valleys and flows around mountains. The maximum filling level of an isolated region is given by the two-dimensional ground profile and the height of the smallest passage. The amount of water taken up may easily be determined by measuring which amount of water has been taken from the continuously flowing rainwater source until the overflow.

For one-dimensional information signals, e.g. audio signals, the amount of water raining down distributes across the entire waveform of the audio wave train. Between two adjacent local wave maximums, the water remains and becomes enclosed. Successively, further sub-areas may be flooded until at the end the amplitude maximum of the entire signal representation is also flooded. To this end, it would have to be assumed that the boundaries at the beginning and at the end of the signal are high, namely at least higher than the global maximum of the signal. But this concept also works without the assumption of such high boundaries. Then, the maximum is not flooded, but the water only rises to the height of the second highest maximum.

For the more detailed representation of the signal it is preferred to mirror the waveform along the t axis to obtain a complementary information signal, to measure the inverted profile accordingly by area determination of the valleys.

Since in particular in the information signals described like wave trains repeat periodically in a quasi-stationary manner, they also always have the same "water content", so that a segmentation may take place due to the water content of a wave train consisting of several water contents of the valleys present in the wave train. Like wave trains are also identified by like area contents being associated.

Figure 4:
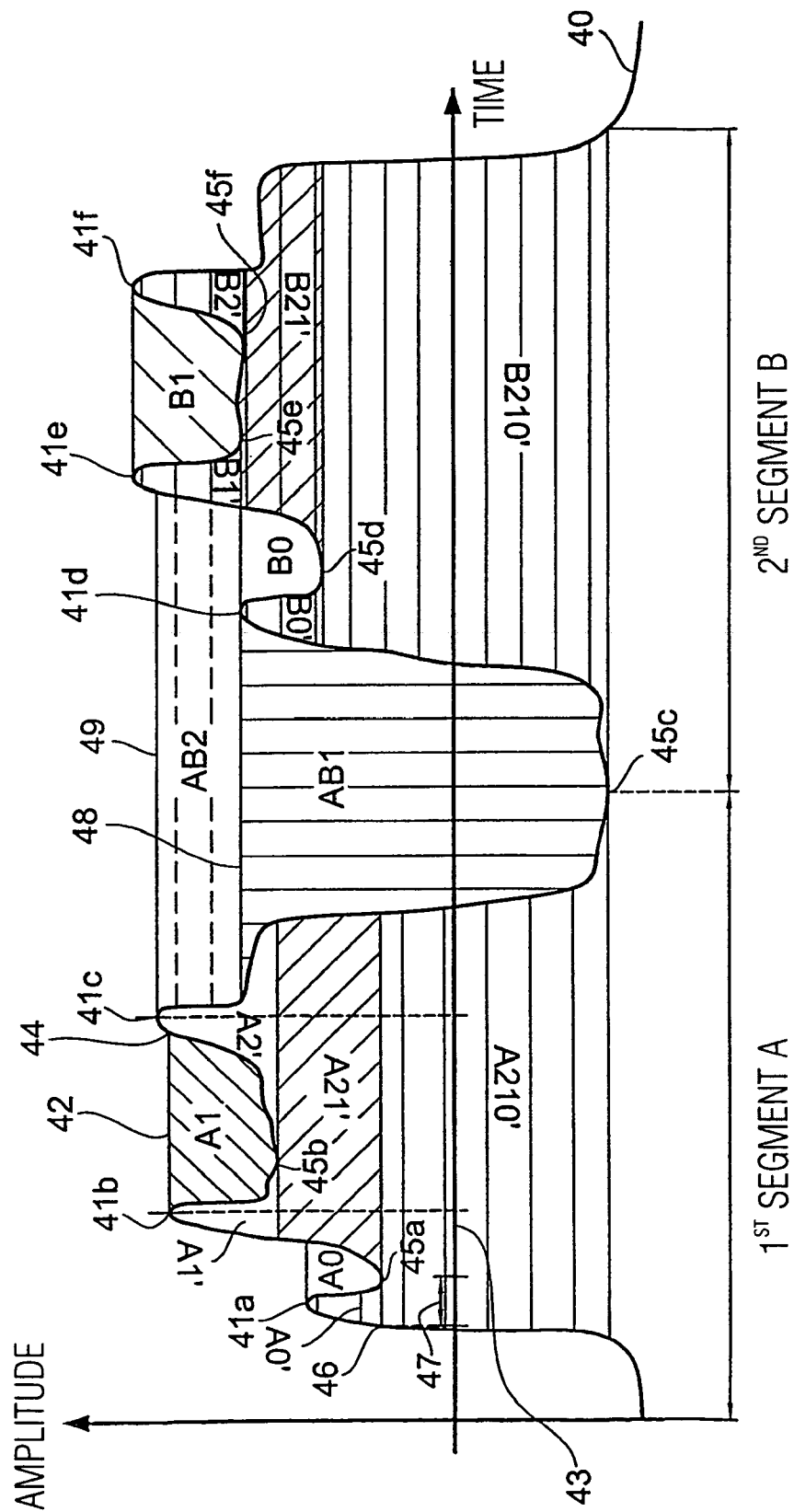
FIG. 4 is an amplitude-time waveform of an example information signal with drawn-in area information for local maximums and local minimums.

As it will still be explained on the basis of FIG. 4, the information signal characterization may not only be performed on the basis of valleys defined by local maximums but also on the basis of mountains whose baseline is defined by a local minimum and whose summits are limited by the waveform. This representation has the same significance as the inversion of the original information signal and as the consideration of the valleys in the inverted information signal.

The inventive concept is applicable for all information signals having an amplitude-time waveform having local extreme values. Such information signals may be audio signals, video signals, voltage signals or current signals identifying measuring quantities of some kind. Taking audio signals or video signals as an example, it is to be pointed out that the temporal waveform, i.e. the information signal does not necessarily have to indicate a voltage amplitude or a current amplitude, but that the information signal may also have power or sonic pressure as amplitude.

In addition, it is to be pointed out that the information signal may have a one-dimensional amplitude, such as with an audio signal, but that the information signal may also have a two-dimensional amplitude, so that the amplitude-time waveform of the information signal actually includes three-dimensional mountains and valleys, while these mountains and valleys only have a two-dimensional waveform in the case of an information signal with one-dimensional amplitude, i.e. may be represented by area information.

In addition, it is to be pointed out that the information signal of course does not have to be a continuous signal, but that it may also be a time-discrete signal, in which an imagined continuous waveform may be assumed for clarity reasons, which results from a straight connection of successive time-discrete signal values or from interpolation.

Subsequently, the present invention is illustrated on the basis of FIG. 4. FIG. 4 shows an information signal 40 with an amplitude-time waveform. The information signal shown in FIG. 4 is an information signal with one-dimensional amplitude. The illustrated information signal is a typical audio signal having repeating wave trains, wherein a wave train is illustrated in the first segment A, while the repeating wave train is illustrated in the second segment B. It is to be pointed out that the information signal in the second segment B of course differs from the information signal in the first segment A, yet not in its basic topology but only in the amplitude at certain time instants in the embodiment shown in FIG. 4.

The information signal has local maximums 41a, 41b, 41c, 41d, 41e, and 41f. A valley of its own is associated with each local maximum. The valley designated A0 is associated with the maximum 41a. Correspondingly, the valley A1 is associated with the maximum 41b. In addition, AB1 is associated with the maximum 41d. Only the rest of the valley lying above, which is designated AB2, is now associated with the maximum 41c because part of the entire valley is already associated with the maximum 41d by AB1. Finally, the valley B1 is associated with the maximum 41e. No valley of its own is associated with the local maximum 41f in FIG. 4. This is, however, only because the further waveform of the information signal is not illustrated any more.

As can be seen from FIG. 4, each valley is defined by a temporal section designated 42 in FIG. 4 taking the valley A1 as an example with which the local maximum 41b is associated. The temporal section extends in particular from the time instant 43 of the occurrence of the local maximum 41b to a temporarily adjacent valley of the information signal having the same amplitude as the local extreme value. This temporal value is designated 44 in FIG. 4. Thus, the area A1 representing the valley associated with the local maximum 41b results. The other valleys A0, AB2, B0, B1 are treated correspondingly. From the series of the valleys A0, A1, AB1, B0, B1, a characterization of the information signal that can be used for the identification already results.

According to the invention, it is however preferred to not only calculate the area information of valleys of the information signal but also the area information of valleys of the inverted information signal. An inversion of the information signal may be achieved if FIG. 4 is simply reversed. This is illustrated by the reversed-written area identifiers A0', A1', A2', A21', A210', B0', B1', B2', B21', B210'.

Alternatively, if FIG. 4 is not "reversed", the "mountains" associated with each local minimum result as follows. An examination of the information signal provides local minimums 45a, 45b, 45c, 45e, 45f. The first mountain A0' is determined by the local minimum 45a as well as by the temporarily adjacent value of the information signal having the same value as the local minimum, i.e. defining a value 46. Between the value 46 and the local minimum 45a, the temporal section 47 results, which identifies the mountain A0'. For the characterization of the information signal the area of the mountain A0' is now calculated according to the illustration shown in FIG. 4 as area information. The mountain A1', A2', etc. is treated in analogy herewith. Furthermore, a case may be seen from FIG. 4, in which the mountain A210' with which the local minimum 45c is associated lies above the mountain A21' with which the local minimum 45a is associated and lies in particular above the mountains A1' and A2' with which the local minimum 45b is associated. From the example shown in FIG. 4 it can thus be seen that two pieces of area information may also be associated with the local minimum, such that both the area information of the mountain A1' and the area information of the mountain A1' are associated with the local minimum 45b. The corresponding applies for the local minimum 45a with which both the area information A0' and the area information A21' are associated.

In the consideration of the area information A210', A21', A2' and A1' it can be seen that here the same procedure has been used as has been explained on the basis of the valleys AB1 and AB2 lying above each other.

After treatment of the information signal insofar as the area information of all mountains and valleys are in association with the corresponding local maximums and minimums or in association with a certain time instant, which is a selected time instant from the temporal section, a series of area information or volume information is obtained, wherein this series of time area values or time volume values is characteristic for the information signal.

Subsequently, with reference to FIG. 1, a preferred apparatus for characterizing an information signal is illustrated. The apparatus for characterizing an information signal having an amplitude-time waveform with local extreme values includes means 10 for determining local extreme values of the information signal, wherein a local extreme value includes a time instant and an amplitude value. Downstream of means 10 for determining local extreme values there are means 11 for ascertaining area or volume information for mountains and valleys of the information signal. The means for ascertaining area information or volume information are operative to calculate the area of a valley or a mountain, wherein a valley or mountain is determined by a temporal section of the information signal, wherein the portion of the information signal extends from the time instant of the local extreme value to a temporarily adjacent value of the information signal having the same amplitude as the local extreme value. The area information of several mountains or valleys is characteristic for the information signal.

Preferably, means 11 will generate a sequence of area information time values and feed them to means 12 for post-processing, which is formed to output a post-processed feature vector or perform a voice recognition, a musical instrument recognition, a melody recognition, a polyphonic sound recognition, or any other recognition of information included in the information signal fed into means 10.

For the determination of local extreme values by means 10, arbitrary known concepts may be used for this, such as a usual minima-maxima search algorithm, which compares a sample of the information signal with the previous sample of the information signal and then recognizes a local maximum if the temporarily later sample is smaller than the temporarily earlier sample and if previously there was a local minimum. Furthermore, the algorithm recognizes a local minimum if the temporarily earlier sample is greater than the temporarily later sample and if previously there was a local maximum. Alternatively, the maxima-minima searcher may be formed to correspondingly evaluate several successive samples. In order to not be influenced by noise overlaying the information signal, means 10 may further be formed to perform a low path filtering of the information signal before the maxima-minima search to obtain a smoother information signal. Of course, arbitrary other possibilities are possible, such as the performing of a polynomial fit to the information signal and the analytical determining of extreme values using the polynomial fit functions. Alternatively, the directly present unfiltered information signal could also be used to determine all maximums and minimums and to then filter out afterwards or no longer use the mountains or valleys with a smaller area content than a default threshold value in the further information signal characterization.

Means 11 for ascertaining area or volume information for mountains and valleys will be typically formed as a numerical integrator to calculate the area between the information signal and the upper valley boundary or the lower mountain boundary. In the case of overlaying mountains or valleys, means 11 for ascertaining area or volume information is formed to take into account that there is already another "valley" below the "valley". The upper boundary line of the underlying valley, i.e. for example the line 48 of FIG. 4, is used as baseline for the integration. The area AB2 is thus calculated using the lateral boundary of the area AB2 given by the information signal and using the baseline 48 and the upper boundary of the area AB2 illustrated in FIG. 4 at 49 and in a way defines the "water level" fixed by the local maximum 41c.

Subsequently, different designs of means 12 for post-processing the sequence of area information or volume information are gone into. As it has already been set forth, the inventive concept is particularly suited for the segmentation of information signals on the basis of the calculated volume information. In FIG. 4, two replicas A and B of the signal form are illustrated. Combination pairs of like or slightly deviating volumes result. In the non-inverted signal, these are the combination pairs (A0, B0), (A1, B1).

In the inverted signal, i.e. with regard to the mountains, the following combination pairs result (A0', B0'), (A1', B1'), (A2', B2'), (B21', A21'), (A210', B210').

The percentage variation ΔF/F is smaller for large enclosed areas, so that in particular with noise the area information comparisons of large areas are a reliable estimation for identity. An example for this is the combination pair (A210', B210!). The repetitive volumes/area sequences (A210'_n, AB2_n, B210'_n) point to the presence of a certain signal form. The entire information waveform is thus divided into m sequences of area or volume intervals on the basis of the series of area information, whereupon area or volume sequences are combined to portions of the same information signal form. An area or volume envelope is determined by the build-up of the wave signal form taking place slowly, wherein the areas or volumes of like repetitive sequences rise in a rise phase, then remain approximately equal in a sustain phase, and then slowly decay in a decay phase. At this point it is to be pointed that typical tones of musical instruments have a rise phase, a sustain phase, and a decay phase. In a piano, for example, in which a string is excited by the impact of a hammer, the rise phase would be relatively short. The sustain phase would also be relatively short, while the decay phase would last relatively long.

An interval boundary then results when areas or volumes abruptly change.

According to the invention, a frequency determination may also be performed on the basis of the series of area or volume information. The frequency of the repetition pattern is determined by forming the distances of the local maximums or local minimums of successive like or only slightly different areas or volumes in the form ((A0, B0), A1, B1)), for example, and when the distances ((A0', B0'), (A1', B1'), (A2', B2'), (A21', B21'), (A210', B210')) are formed in the inverted signal.

The relief of successive peaks and troughs emerging in a way is ascertained by the determination of the repetition pattern in the form (A210', AB2, B210'). The fine profile of a mountain or a valley is determined by the indication of the structuring elements A0, A1 and A0', A1', A2', A21'.

According to the invention, means 12 for post-processing is further formed to assign a vector preferably including the numerical value of the area content or volume content and the temporal value of the occurrence to each area information or volume information. Any temporal value of the temporal section may be taken as temporal value of the occurrence. It is preferred to associate the time instant of the occurrence of the local extreme value associated with the area content with an area content. If a local extreme value, such as the local extreme value 45b of FIG. 4 gives rise to two "mountains" A1', A2' shown in FIG. 4, the same temporal value is associated with the area information A1', A2', namely the temporal value of the occurrence of the local minimum 45b.

Thus, a number field of n vectors along the time axis emerges. Such sequences of vectors may be compared with DNA sequencing methods with existing volume vectors stored in a music database to perform for example information signal identification via identifications associated with the individual vectors in the music database.

If the information signals, such as audio signals of different recordings are normalized, area or volume sequences may be directly compared with each other. With a frequency determination, areas or volumes having the same audio signal form, but having different areas or volumes by the frequency-dependent time stretch, may be referenced to each other.

Figure 1:
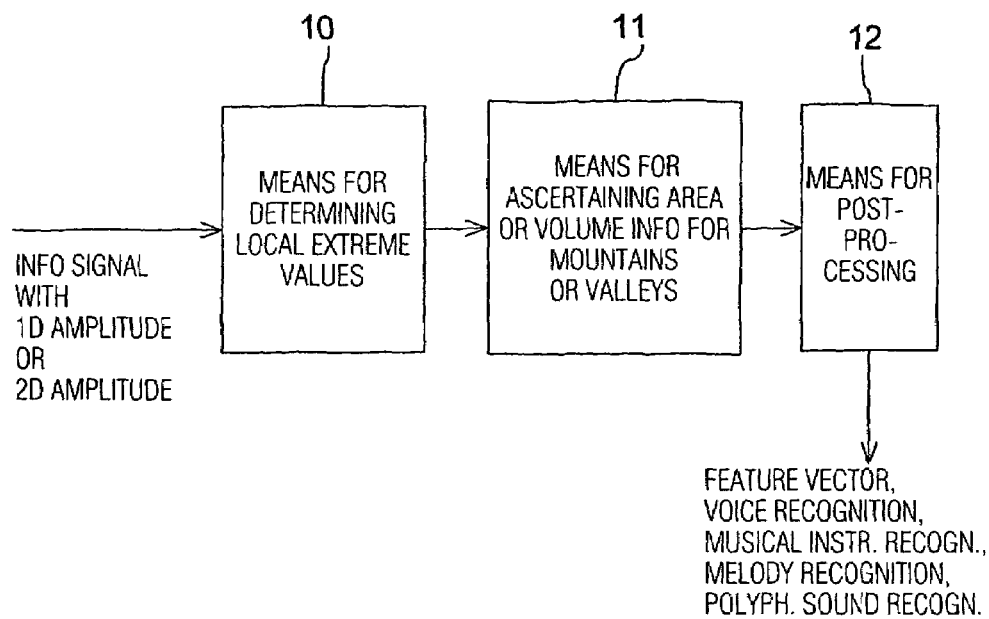
FIG. 1 is a block circuit diagram of an inventive apparatus for characterizing an information signal.

According to the invention, further area form describing parameters, such as the longitudinal extension may be determined by means 12 for post-processing of FIG. 1 from the volumes or areas and the location of the maximums or minimums. Such further parameters permit a statement whether there are for example voice sounds or signals evoked from musical instruments. In the information signal itself, preferably only relative areas or volumes may be used by means 12 for post-processing by the ratio of successive areas or volumes being formed by means 12 for post-processing.

Generally speaking, voice sounds, polyphonic sounds or monophonic sounds evoked from musical instruments have audio signal forms deviating from each other and are therefore distinguishable on the basis of the area or volume sequences. The frequency-dependent content of a like audio signal form is also determined by a change of areas or volumes. If an overall area is uniquely associable with a voice sound (vowel), vowel portions may be read out from the information signal. Consonants and transition portions may also be determined by indication of the area or volume sequences using means 12 for post-processing. The same applies for polyphonic sounds as well as for melody series.

Figure 2:
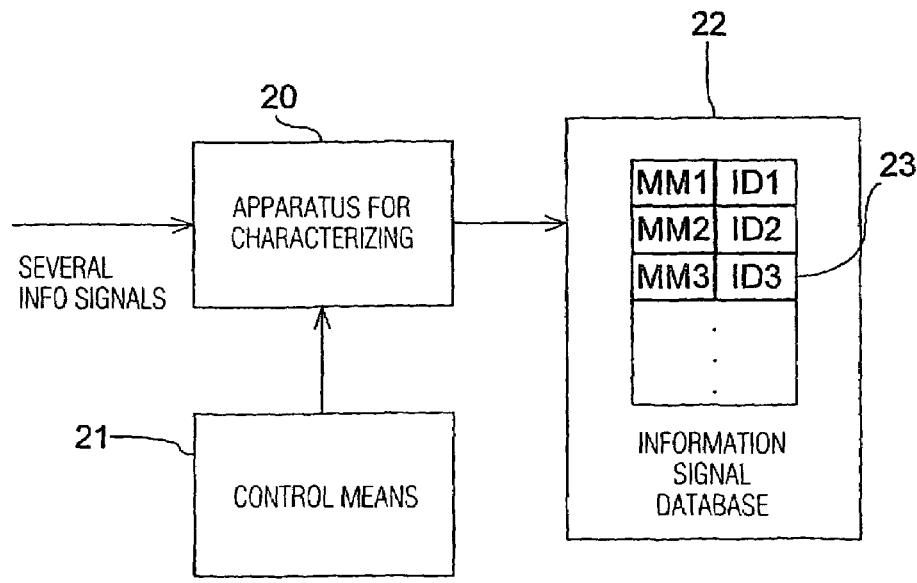
FIG. 2 is a block circuit diagram of an inventive apparatus for building up an information signal database.

FIG. 2 shows an apparatus according to a further aspect of the present invention, which serves for the build-up of an information signal database. Several information signals are successively fed into an apparatus 20 for characterizing that may in principle be constructed as it is illustrated in FIG. 1 under the control of control means 21 to determine a feature vector for each of the several information signals, which is derived from the area or volume information. With this, an information signal database 22 may be built up whose center piece is a memory 23 in which the feature vectors (MM1, MM2, MM3) of the information signals fed into means 20 are stored each in association with certain identifiers (ID1, ID2, ID3). The identifiers ID1, ID2, ID3 permit identification of the information signals whose feature vectors MM1, MM2, MM3 are filed in the information signal database and in particular in the memory 23 of the information signal database. The more the individual information signals have been processed by the apparatus 20 for characterizing and are present in the memory in a corresponding form, i.e. by means of a feature vector characterizing each of them, the more universal an information signal database is.

Figure 3:
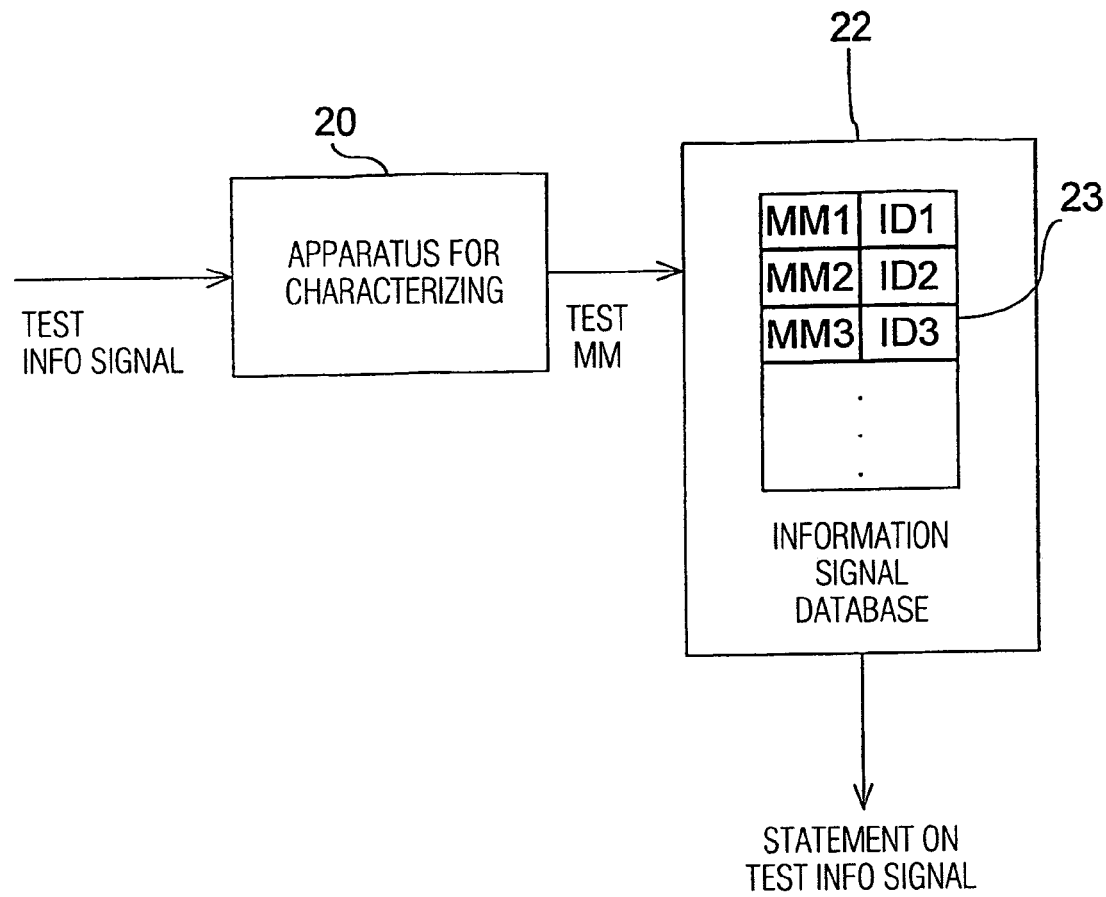
FIG. 3 is a block circuit diagram of an inventive apparatus for identifying a test information signal using an information signal database.

FIG. 3 shows an inventive apparatus for identifying a test information signal on the basis of an information signal database 22 that may in principle be constructed exactly like the information signal database described on the basis of FIG. 2. To this end, a test information signal to be identified of which an identification regarding certain features thereof in qualitative and/or quantitative respect is to be obtained is fed into the apparatus 20 for characterizing. A test feature vector characterizing the test information signal is ascertained from the test information signal by means 20 for characterizing. With this test feature vector, then a search in the information signal database is performed among the feature vectors MM1, MM2, MM3 stored in the memory 23 to obtain a statement about the test information signal at the output of the information signal database.

The statement about the test information signal provided by the apparatus for identifying the test information signal shown in FIG. 3 may for example be an actual determination of the author of the information signal. A statement may however also be a quantitative statement insofar as the test information signal for example contains a certain number of vowels or consonants. In this case, the feature vectors MM1, MM2, MM3 stored in the information signal database would be feature vectors of individual vowels or consonants. Since the feature vector that may be created by the apparatus for characterizing 20 is a quantitative feature vector, and since in this case the feature vectors stored in the information signal database are also quantitative features, also quantitative statements about the test information signal may be made, namely in that it has a certain degree of similarity to an information signal present in the information signal database on the basis of its feature vector.

Figure 5:
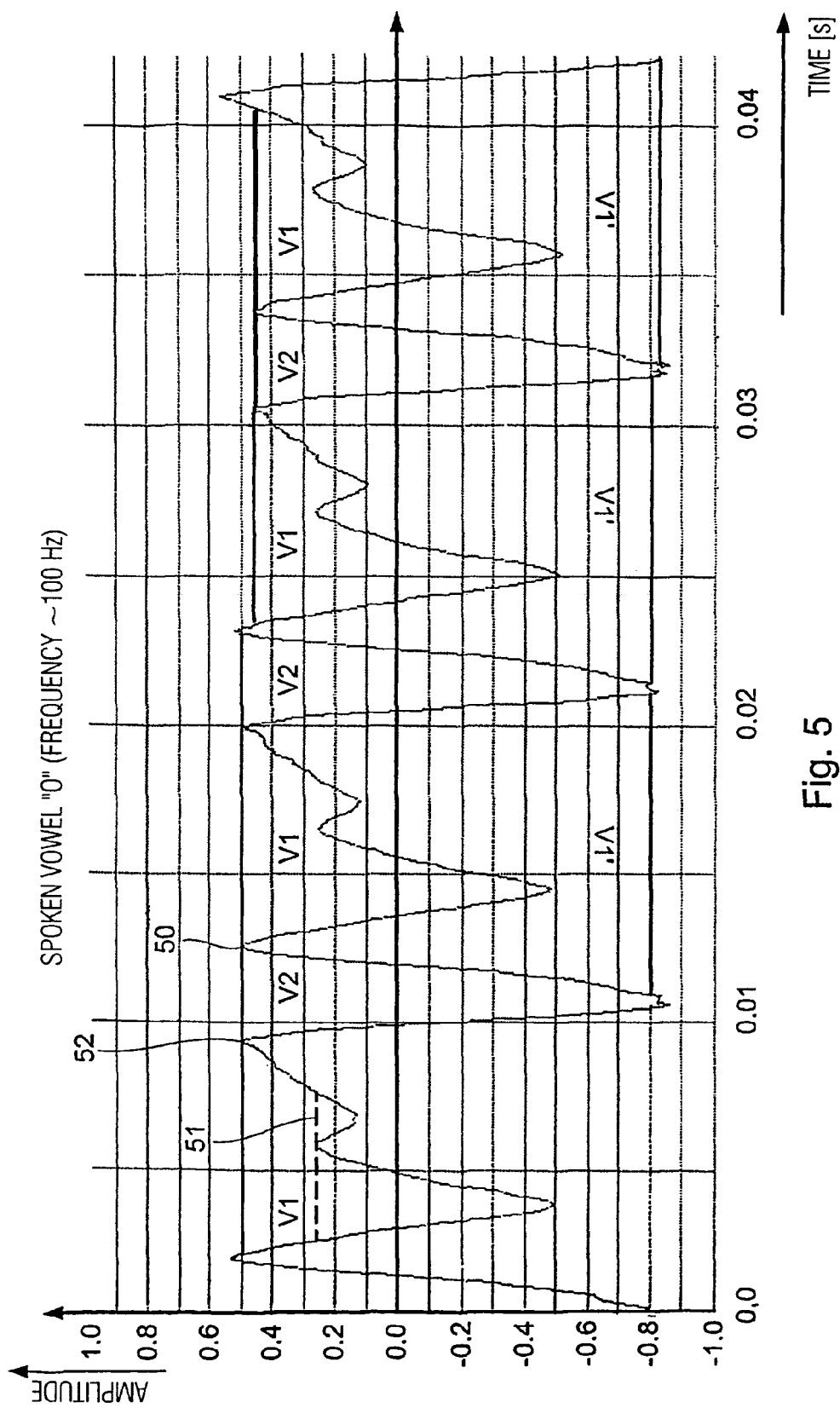
FIG. 5 is an exemplary signal form diagram for a spoken vowel "o"

FIG. 5 shows an example signal form diagram resulting when the vowel "o" is spoken by the inventor at a frequency of about 100 Hz. In FIG. 5, the amplitude is plotted along the ordinate normalized to values between −1.0 and 1.0. In FIG. 5, the time is plotted in seconds along the abscissa. It results that the vowel "o" has a strongly repetitive signal pattern having very similar area or volume information sequences. In detail, it can be seen that the sequence of area information V1, V2 repeats periodically.

By asserting this sequence V1, V2 in the temporal series of volume information, according to the invention, segmentation is performed, for example at the local maximum determining the area information designated with V2 and designated with 50 in FIG. 5.

Alternatively, segmentation could also be made at a local minimum, such as the minimum locally adjacent to the maximum 50 of the local maximum again adjacent to the left, identifying the valley designated with V1.

On the basis of FIG. 5, it can further be seen that the area information V1 includes the entire left valley of the signal form. The valley identified by V1 thus includes the area information of both valleys below the dashed line 51 as well as the area information between line 51 and the upper boundary line defined by a local maximum 52. From FIG. 5 it can be seen that either sequences of individual area information of valleys or mountains may be used or that for the segmentation on the basis of occurring area information sequences also "combined" valleys/mountains may be taken, such as the valley identified by V1.

In a further preferred embodiment of the present invention, apart from the area/volume information, also the height information is taken into account. This concept again has its analogon in geodesy, if not only the amount of water in a valley is taken into account, but the potential energy of these amounts of water in the valley. Thus, a hyperfine structure of the signal can be indicated by additionally indicating the energy term of the potential energy. The potential energy equals the product of density, volume, acceleration, and height. Furthermore, a somehow compression-free liquid may be assumed. Moreover, the density and the acceleration are assumed constant and adjusted so that the potential energy of a "reservoir" is calculated from the integral product of enclosed volume and height. The energy of the valley designated with V1 in FIG. 5 may be calculated by breaking down the valley into small rectangles, wherein the area of each rectangle is multiplied by the height of this rectangle, i.e. the amplitude associated with this rectangle, before totalizing.

Thus, volumes situated higher are weighted more strongly, while noise about the zero line is weighted less strongly. The weighting of area information situated higher by inclusion of the corresponding height corresponds to the usual nature of music signals, in which loud signal contents tend to be more highly information-carrying than quiet signal contents.

A signal with stronger amplitude thus carries more information than a signal with weaker amplitude. This aspect is met by the weighting of the series of area information with corresponding height information to somehow obtain the potential energy of water situated in a valley.

Subsequently, a preferred embodiment is further gone into, for example for calculating the area A1 of FIG. 4. Preferably, the area A1 is calculated such that at least the area of the rectangle resulting from the upper boundary line 42, a lower boundary line going through the local minimum 45b as well as the two dashed side lines drawn in in FIG. 4 is calculated. Then, a normal integration of the signal from the local maximum 41b to the point 44 is performed, wherein the line passing through the local minimum 45b is taken as zero line of the function. The area obtained thereby is then subtracted from the rectangle area originally calculated to finally obtain the area A1 of the valley defined by the local maximum 41b.

It is to be pointed out that for the calculation of the areas of the mountains not a renewed integration across the information signal has to be conducted, but that a single integration is sufficient to then compile all area information of the valleys or mountains on the basis of the curve integral and various rectangles.

As it has already been set forth, the vowel "o" in FIG. 5 has been spoken at about 100 Hz. If the vowel were spoken at a higher frequency, a similar time diagram would result, which is, however, compressed with regard to the time axis. But if the vowel were spoken at a lower frequency than 100 Hz, a time diagram similar in principle to FIG. 5 would result, which is, however, stretched by a corresponding factor dependent on the frequency difference.

For the frequency amplitude normalization, according to the invention, thus a vowel spoken at a nominal frequency, such as 100 Hz, is filed in the information signal database 22 of FIG. 3 on the basis of its feature vector and its identification. A test signal, of which it is not known at which frequency it has been spoken, is then subjected to a sweep across the frequency with respect to its test feature vector (FIG. 3) within the information signal database. This means that the waveform of the test signal, the wave form of the signal stored in the information signal database, or both signals or feature vectors are compressed or stretched correspondingly in order to assert a match in each compression factor, e.g. on the basis of the method of least error squares. With this, it may be ascertained if a sufficiently good match has taken place at all at any time instant of the frequency sweep. If this is answered in the negative, the test information signal does for example not include a spoken vowel "o". On the other hand, if a sufficiently good match is asserted at a certain adjustment in the frequency sweep, it may be assumed that a spoken vowel "o" is present in the test information signal and that this spoken vowel has been spoken at a certain frequency.

It is to be pointed out that the absolute area information changes by the stretch/compression of the feature vector or if the stretch/compression is performed before the extraction of the feature vector. But the relations of the area/volume information to each other remain the same, so that the stretch/compression of the time axis does not have an effect on sequences of area information insofar as these could no longer be identified.

An analog procedure is inventively employed with respect to amplitude normalization. If the spoken vowel "o" of FIG. 5 with a certain mean volume is stored in the information signal database 22 of FIG. 3, the stretch/compression (amplification/attenuation) may be performed along the amplitude axis with subsequent method of error squares, to firstly assert if the vowel is at all present in a test information signal, and to secondly assert with which volume the vowel has occurred in the test information signal. For certain search strategies for the individual or combined alteration, i.e. stretch/compression along the time axis and the amplitude axis, reference is made to the prior art with respect to DNA sequencing concepts or to methods of least error squares, to determine the minimum metric or the next neighbor, for example.

Alternatively, for the frequency/amplitude calibration, an information signal database 22 may be created, in which the individual feature vectors have been recorded with certain volume/frequency adjustments of a measuring system. As far as there is access hereto, the same adjustments e.g. with regard to the volume may be demanded from the test information signal. Hereupon, a characteristic curve may be derived to convert or map area/volume information of a vowel "o" spoken at for example 140 Hz into area/volume information at the predetermined recording adjustment, such as a frequency of 100 Hz.

Finally, it is pointed out that strongly significant features of an audio signal lie in great volume/area information as an example for an information signal. Such great volume/area information results by summation of the area information AB1, AB2, B0 of FIG. 4. The entire valley defined by AB2, AB1, B0 obtains its height boundary 49 due to the local maximum 41c. By totalizing of the valleys defined by local maximums with smaller amplitude, such as the local maximum 41d, the entire area of the valley limited to the top by the boundary line 49 is obtained. It is proceeded correspondingly for the valleys of the inverted signal, i.e. the mountains of the non-inverted signal. The mountain as a whole identifying the first segment A results from the area information A210', A0', A21', A1', A2'. By ascertaining the area information of an entire mountain or an entire valley, according to the invention, segmentation may be performed with reliable results, because such great area information is characteristic for mountains or valleys for the rough structure, i.e. for the repetitive structure of the information signal.

As a further feature it is preferred to add the area/volume information of an individual sequence V1, V2 of FIG. 5 to obtain an overall area of the sequence, with which a search in a database may be undertaken, in which overall areas of known sequences are stored. The feature of the overall area is less characteristic for a signal, but is more strongly compressed so that a smaller music database and a faster search are possible. This feature is sufficient when it is still sufficiently characteristic. In this example, the easily achievable scalability between the feature of the characterization and the storage space feature of the inventive concept can be seen.

Alternatively or in addition to the overall area, the overall energy of a sequence V1, V2 of FIG. 5 could also be employed. The above explanations also apply to the energy feature.

The inventive apparatuses and methods may advantageously be supplemented by normalization. The normalization is particularly advantageous if a signal is subjected to a feature extraction procedure according to the present invention to obtain, for example, a series of volume information or area information as a feature, wherein this series, if it is a recurring sequence in a signal, as it may be obtained by above-described segmentation algorithms, is referred to as original vector. If it is e.g. assumed that an original vector of a signal is stored in a database for comparison purposes, a certain level or a certain volume of the music signal was used for the acquisition of this original vector to generate the original vector. A comparison of an original vector having been derived from a test signal with the original vector stored in the database is then easily possible, when the test signal is present with the same amplitude ratios as the comparison signal from which the original vector stored in the database has been derived. In other words, this means that an original vector comparison is easily possible if both signals have identical waveforms A(t).

This becomes problematic, however, if the test signal, whose original vector is to be compared with an original vector stored in the database, is played more loudly or played more quietly. In mathematical terms this means that the signal A(t) underlying the original vector in the database does not equal the test signal, but that the test signal is a c-fold of the signal, i.e. may be described with c·A(t), wherein c is greater or smaller than 1. If c is greater than 1, the test signal is louder than the database signal, the original vector of which is stored in the database. If the factor c is smaller than 1 and of course non-zero, the test signal is quieter than the database signal.

According to the invention, to not let a database comparison be thwarted by volume differences or not complicate it, therefore normalization of the test signal and preferably also the database signal with regard to the original vector is made.

Figure 6:
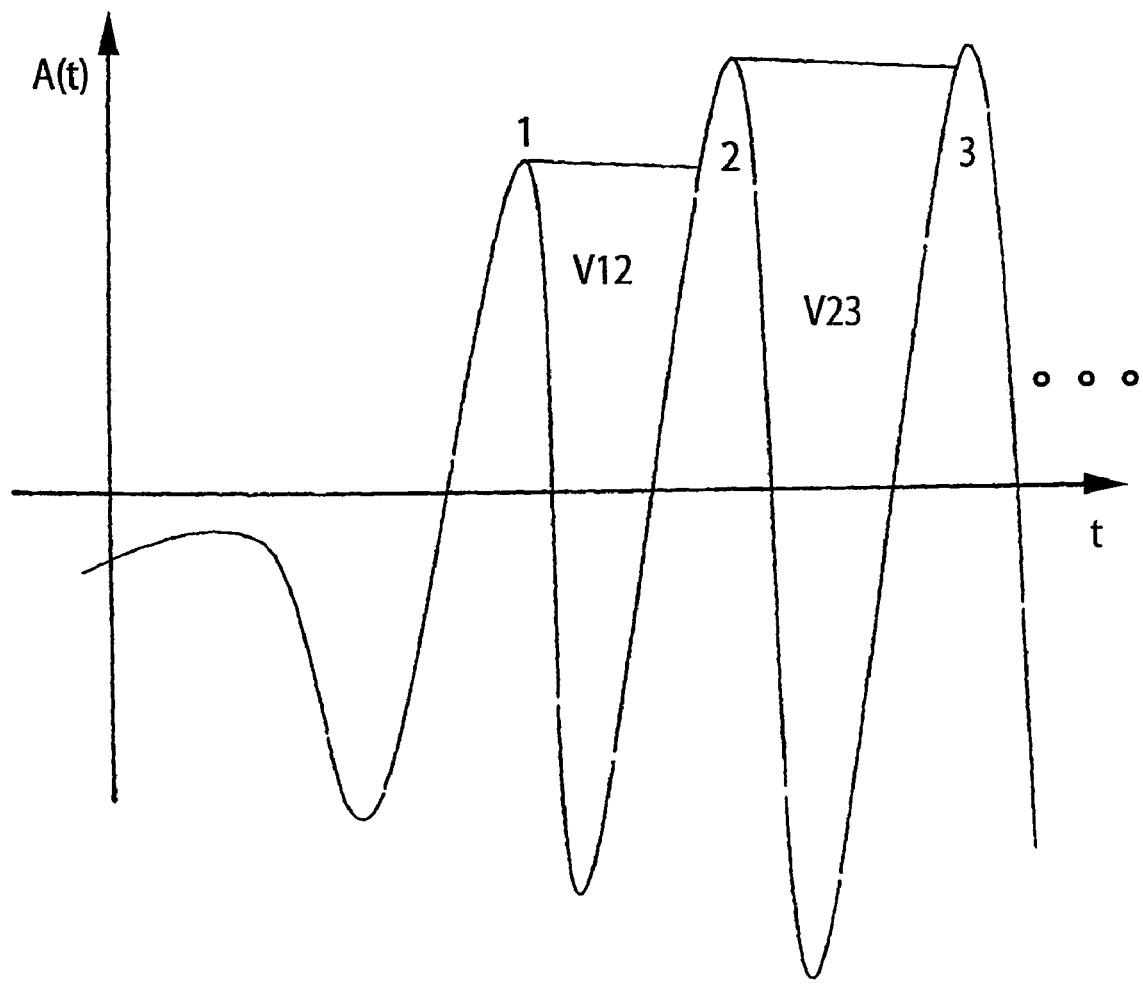
FIG. 6 is an amplitude-time waveform for the illustration of the normalization of an area or a volume to an overall area or an overall volume.

In FIG. 6, an example waveform A(t) is shown. A non-normalized original vector will include the volume series or area series V12, V23, ..., V1-1, I. The original vector would then be a vector including a volume series that is preferably a segment but that could also be part of a segment.

As it has been explained, with a stretch of the test signal by a factor c, a comparison with a corresponding original vector, which has been derived from a database signal, is problematic.

Normalization of all components of the original vector is therefore made, namely normalization with a normalization value equally corresponding to the overall volume of all single volumes of a series of volumes. The overall volume of a series or of an original vector is calculated by addition of all single volumes in the original vector. For the non-stretched signal, $$Vges = V12 + V23 + V34 + \ldots + Vn-1,n$$

can be obtained.

The overall volume of a stretched signal A'(t)=c·A(t) imparted with the stretch factor c is calculated as follows:

$$V'ges = c \cdot V12 + c \cdot V23 + \ldots + c \cdot Vn-1,n.$$

From the comparison of the overall volume for the stretched signal Vges with the overall volume of the non-stretched signal Vges, it can be seen that these are multiplicatively linked via the stretch factor c. According to the invention, therefore normalization of each individual component Vi-1, i of a series of volumes or areas is made by the overall volume or the overall area of the series.

From the equation link below the diagram in FIG. 6 it can be seen that the stretch factor c is reduced by this normalization, so that a normalized original vector is an invariant quantity with regard to the volume of the signal. In this respect it is preferred to normalize both the original vector stored in the database and the original vector of the test signal. In this case, both original vectors are invariant against any amplitude differences that may be described by multiplicative stretch with a factor c, so that volume differences between a test signal and a database signal are insignificant and do not affect music recognition.

At this point it is to be pointed out that an original vector does not necessarily have to include each successive volume in a sequence having been segmented. Depending on application, it is also sufficient to store e.g. only every second or every third volume of a sequence to decrease the memory need for the original vectors or normalized original vectors. In this case, however, the meaningfulness also suffers, so that a trade-off is to be found here. If such a "fragmentary" original vector is to be used, it will likewise be normalized by the overall volume of the fragmentary original vector or the overall area of the fragmentary original vector. It is, however, only important that the original vector stored in the database, with which a test original vector is to be compared, has the same "fragmentation".

The inventive method for characterizing, for building up an information signal database, or for identifying a test information signal on the basis of an information signal database may be implemented depending on existing need in hardware or in software. The implementation may take place on a digital storage medium, in particular a floppy disk or CD with electronically readable control signals, which may cooperate with a programmable computer system so that the corresponding method is executed. In general, the invention thus also consists in a computer program product with program code stored on a machine-readable carrier for the performance of one or more of the inventive methods, when the computer program product is running on a computer. In other words, the invention thus is a computer program with a program code for the performance of a method, when the computer program is running on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for characterizing an information signal having an amplitude-time waveform with local extreme values, comprising:
a processor for determining the local extreme values of the information signal, wherein a local extreme value is defined by a time instant and an amplitude; and
a calculator for ascertaining area information of valleys or mountains of the information signal in case of a one-dimensional amplitude of the information signal or of volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys is characteristic for the information signal.

2. The apparatus of claim 1,
wherein the processor is formed to determine local maximums of the information signal, and
wherein the calculator is formed to ascertain area information of valleys of the information signal, wherein a valley is defined by a temporal section of the information signal extending from the time instant of the local maximum to a temporarily adjacent value of the information signal having the same amplitude as the local maximum.

3. The apparatus of claim 2,
wherein the calculator is formed to determine area information about a valley of the information signal associated with a local maximum, which is present above a valley of the information signal with which a further local maximum with a smaller amplitude than the one local maximum associated, so that the area information of the one valley together with the area information of the other valley points to a geometrical area between the information signal and an upper boundary line of the one valley.

4. The apparatus of claim 1,
wherein the processor is formed to determine local minima of the information signal, and
wherein the calculator is formed to ascertain area information from mountains of the information signal, wherein a mountain is defined by a temporal section of the information signal extending from the time instant of the local minimum to a temporarily adjacent value of the information signal having the same amplitude as the local minimum.

5. The apparatus of claim 4,
wherein the calculator is formed to determine area information about a mountain of the information signal associated with a first minimum, which is present above a mountain of the information signal with which a second minimum with a smaller amplitude than the first minimum is associated, so that the area information of the first mountain together with the area information of the second mountain points to a geometric area between the information signal and a lower boundary line of the first mountain.

6. The apparatus of claim 1,
wherein the calculator is formed to calculate as area information the geometric area of a valley or mountain associated with a local extreme value.

7. The apparatus of claim 1,
wherein the calculator is formed to assign a temporal value taken from the temporal section by which the valley or the mountain is defined to the area information for a valley or a mountain, whereby a series of area information time value tupels arises.

8. The apparatus of claim 7,
wherein the time value is the time instant of the local extreme value associated with the valley or the mountain.

9. The apparatus of claim 1,
wherein the calculator is formed to ascertain quantitative values as area information.

10. The apparatus of claim 9,
further comprising:
a post-processor for post-processing the area information of several mountains or valleys.

11. The apparatus of claim 10,
wherein the post-processor is formed to suppress mountains or valleys whose area information is smaller than a predetermined threshold value in a further processing.

12. The apparatus of claim 10,
wherein the post-processor is formed to ascertain a series of area information changes by determining a ratio of temporarily successive area information each or by forming a difference between two successive pieces of area information each.

13. The apparatus of claim 10,
wherein the post-processor is formed to examine the series of area information for repeating sequences of area information.

14. The apparatus of claim 13,
wherein the post-processor is formed to segment the information signal according to repeating sequences.

15. The apparatus of claim 10,
wherein the post-processor is formed to determine combination pairs of identical area information or of area information differing by less than a predetermined tolerance, and to calculate frequency information on the information signal on the basis of a time difference between time instants of area information of a combination pair.

16. The apparatus of claim 10,
wherein the post-processor is formed to determine abrupt area information changes in the series of area information, and to segment the information signal at abrupt area information changes.

17. The apparatus of claim 10,
wherein the post-processor is formed to normalize area information to obtain a series of normalized area information.

18. The apparatus of claim 10,
wherein the post-processor is formed to obtain a longitudinal extension of mountains or valleys using the area information and associated time instants, to be able to determine whether the information signal is an audio signal with voice or instrumental music.

19. The apparatus of claim 1,
wherein the calculator is formed to ascertain a series of area information or volume information,
wherein the apparatus further comprises a normalizer formed to calculate an overall area or an overall volume by addition of at least two elements of the series of area information or volume information, and further formed to divide the elements of the series by the overall area or the overall volume to obtain a normalized series.

20. The apparatus of claim 19,
wherein the normalizer is formed to totalize all elements of a segment of the series, wherein a segment represents an original pattern repeating in an unsegmented series.

21. A computer implemented method for characterizing an information signal having an amplitude-time waveform with local extreme values, comprising;
determining the local extreme values of the information signal with a processor, wherein a local extreme value is defined by a time instant and an amplitude; and
ascertaining with a calculator, area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal.

22. An apparatus for building up an information signal database, comprising:
a characterizer for characterizing an information signal having an amplitude-time waveform with local extreme values to obtain area information for an information signal, comprising:
  a processor for determining the local extreme values of the information signal, wherein a local extreme value is defined by a time instant and an amplitude; and
  a calculator for ascertaining area information of valleys or mountains of the information signal in case of a one-dimensional amplitude of the information signal or of volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys is characteristic for the information signal;
a feeder for feeding several information signals to the characterizer, to obtain, for each information signal, a feature vector derived from the area information for the information signal; and
a storage for storing feature vectors for the information signals, wherein an identifier of the information signal from which the respective feature vector has been ascertained, is associated with each feature vector.

23. A computer implemented method for building up an information signal database, comprising:
characterizing, a characterizer, an information signal having an amplitude-time waveform with local extreme values to obtain area information for an information signal, comprising:
  determining the local extreme values of the information signal with a processor, wherein a local extreme value is defined by a time instant and an amplitude; and ascertaining, with a calculator area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal;
performing the step of characterizing using a feeder, with several information signals to obtain a feature vector derived from the area information for the information signal for each information signal; and storing feature vectors for the information signal in a storage, wherein an identifier of the information signal from which the respective feature vector has been ascertained is associated with each feature vector.

24. An apparatus for identifying an information signal using an information signal database storing the feature vectors in association with respective information signal identifiers, comprising:
a characterizer for characterizing an information signal having an amplitude-time waveform with local extreme values, to obtain area information of several mountains or valleys, which are characteristic for the information signal, comprising:
a processor for determining the local extreme values of the information signal, wherein a local extreme value is defined by a time instant and an amplitude; and
a calculator for ascertaining area information of valleys or mountains of the information signal in case of a one-dimensional amplitude of the information signal or of volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys is characteristic for the information signal; and
a comparator for comparing a feature vector derived from the area information or volume information characteristic for a test information signal with feature vectors stored in the information signal database, to make a statement on the information signal.

25. A computer implemented method for identifying an information signal using an information signal database storing the feature vectors in association with respective information signal identifiers, comprising:
characterizing, with a characterizer, an information signal having an amplitude-time waveform with local extreme values, to obtain area information of several mountains or valleys, which are characteristic for the information signal, comprising:
determining the local extreme values of the information signal with a processor, wherein a local extreme value is defined by a time instant and an amplitude; and
ascertaining, with a calculator, area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal; and
comparing, with a calculator, a feature vector derived from the area information or volume information characteristic for a test information signal with feature vectors stored in the information signal database, to make a statement on the information signal.

26. A computer storage medium containing a computer program with a program code for performing, when the program runs on a computer, a method for characterizing an information signal having an amplitude-time waveform with local extreme values, comprising:
determining the local extreme values of the information signal with a processor, wherein a local extreme value is defined by a time instant and an amplitude; and
ascertaining, with a calculator, area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information to several mountains or valleys are characteristic for the information signal.

27. A computer storage medium containing a computer program with a program code for performing, when the program runs on a computer, a method for building up an information signal database, comprising:
characterizing, with a characterizer, an information signal having an amplitude-time waveform with local extreme values to obtain area information for an information signal, comprising:
determining the local extreme values of the information signal with a processor, wherein a local extreme value is defined by a time instant and an amplitude; and
ascertaining, with a calculator, area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal;
performing the step of characterizing using a feeder, with several information signals to obtain a feature vector derived from the area information for the information signal for each information signal; and
storing feature vectors for the information signal in a storage, wherein an identifier of the information signal from which the respective feature vector has been ascertained is associated with each feature vector.

28. A computer storage medium containing a computer program with a program code for performing, when the program runs on a computer, a method for identifying an information signal using an information signal database storing the feature vectors in association with respective information signal identifiers, comprising:
characterizing, with a characterizer, an information signal having an amplitude-time waveform with local extreme values, to obtain area information of several mountains or valleys, which are characteristic for the information signal, comprising:

determining, with a processor, the local extreme values of the information signal, wherein a local extreme value is defined by a time instant and an amplitude; and ascertaining, with a calculator, area information of valleys or mountains of the information signal in case of a one-dimensional amplitude of the information signal or volume information of valleys or mountains of the information signal in case of a two-dimensional amplitude of the information signal, wherein a valley or mountain is defined by a temporal section of the information signal, wherein the section of the information signal extends from the time instant of a local extreme value to a temporarily adjacent value of the information signal having the same amplitude as the local extreme value, wherein the area information or volume information of several mountains or valleys are characteristic for the information signal; and comparing, with a comparator, a feature vector derived from the area information or volume information characteristic for a test information signal with feature vectors stored in the information signal database, to make a statement on the information signal.

* * * * *